United States Patent
Kim et al.

(10) Patent No.: US 10,534,901 B2
(45) Date of Patent: Jan. 14, 2020

(54) USER AUTHENTICATION METHOD AND APPARATUS USING INFRARED RAY (IR) IMAGE

(71) Applicant: Samsung Electronics Co., Ltd., Suwon-si (KR)

(72) Inventors: Jihye Kim, Anyang-si (KR); Jinwoo Son, Seoul (KR); Chang Kyu Choi, Seongnam-si (KR); Jae-Joon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 15/922,091

(22) Filed: Mar. 15, 2018

(65) Prior Publication Data

US 2019/0005217 A1    Jan. 3, 2019

(30) Foreign Application Priority Data

Jul. 3, 2017    (KR) .................. 10-2017-0084177

(51) Int. Cl.
*G06F 21/32*    (2013.01)
*G06K 9/62*    (2006.01)
*G06K 9/00*    (2006.01)
*G06K 9/20*    (2006.01)
*G06K 9/22*    (2006.01)

(52) U.S. Cl.
CPC ......... *G06F 21/32* (2013.01); *G06K 9/00892* (2013.01); *G06K 9/00926* (2013.01); *G06K 9/2018* (2013.01); *G06K 9/2027* (2013.01); *G06K 9/22* (2013.01); *G06K 9/6202* (2013.01); *G06K 9/629* (2013.01); *G06K 9/6215* (2013.01); *G06K 9/6269* (2013.01)

(58) Field of Classification Search
CPC ................ G06F 21/32; G06K 9/00892; G06K 9/00926; G06K 9/2018; G06K 9/2027; G06K 9/22; G06K 9/6202; G06K 9/6215; G06K 9/6269; G06K 9/629
See application file for complete search history.

(56) References Cited

U.S. PATENT DOCUMENTS

| | | |
|---|---|---|
| 2010/0115611 A1 | 5/2010 | Morihara |
| 2016/0188026 A1 | 6/2016 | Klinghult |
| 2016/0191517 A1 | 6/2016 | Bae et al. |
| 2017/0032205 A1 | 2/2017 | Paul et al. |
| 2018/0189551 A1* | 7/2018 | Ranganath ......... G06K 9/00295 |

FOREIGN PATENT DOCUMENTS

| | | |
|---|---|---|
| JP | 2015-108942 A | 6/2015 |
| KR | 10-2013-0106080 A | 9/2013 |
| KR | 10-2013-0131719 A | 12/2013 |
| KR | 10-2016-0037305 A | 4/2016 |
| KR | 10-2016-0120453 A | 10/2016 |
| WO | WO 2006/006533 A1 | 1/2006 |

* cited by examiner

*Primary Examiner* — Nirav G Patel
(74) *Attorney, Agent, or Firm* — NSIP Law

(57) ABSTRACT

Provided is a user authentication method and apparatus that obtains first environmental information indicating an environmental condition in which an input image of a user is captured, extracts a first feature vector from the input image, selects a second feature vector including second environmental information that matches the first environmental information from enrolled feature vectors in an enrollment database (DB), and authenticates the user based on the first feature vector and the second feature vector.

25 Claims, 10 Drawing Sheets

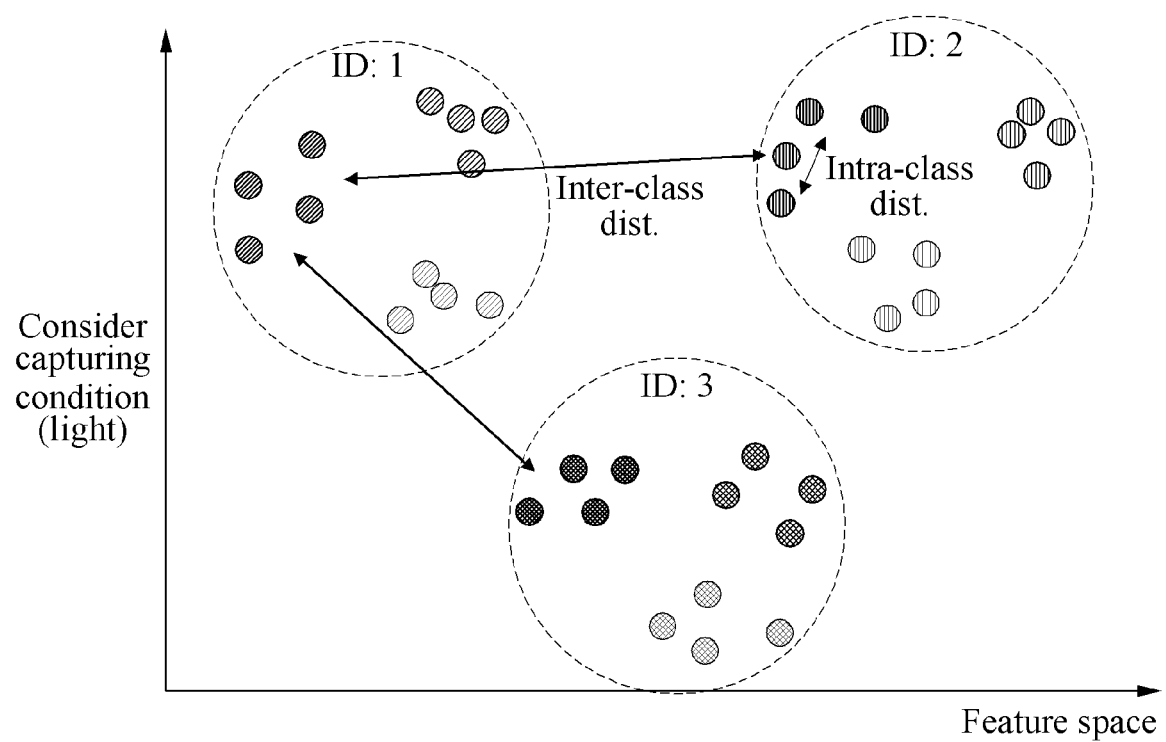

FIG. 5
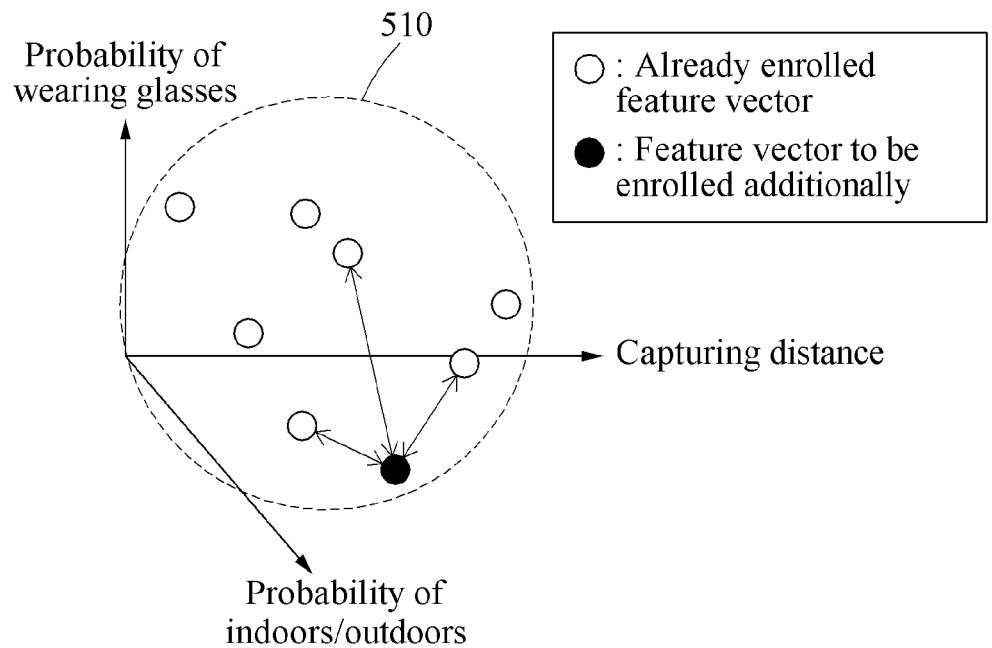
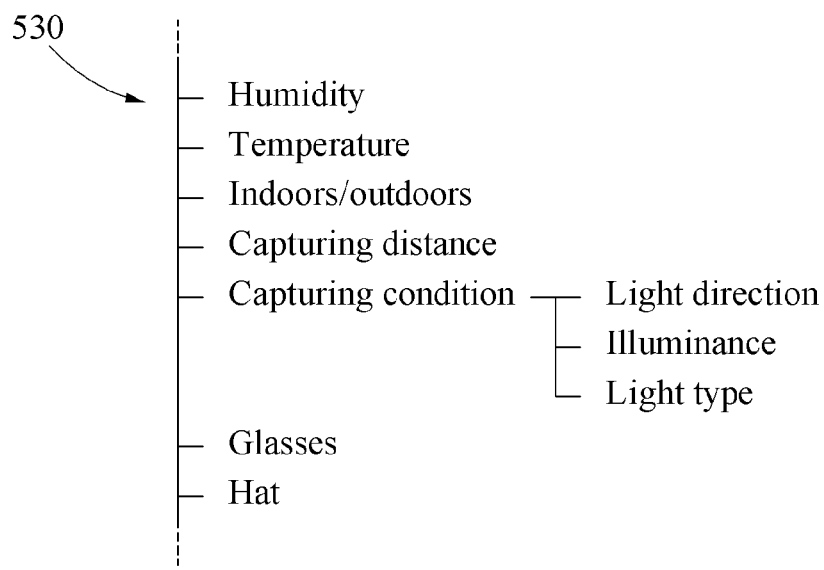

USER AUTHENTICATION METHOD AND APPARATUS USING INFRARED RAY (IR) IMAGE

CROSS-REFERENCE TO RELATED APPLICATIONS

This application claims the benefit under 35 USC § 119(a) of Korean Patent Application No. 10-2017-0084177 filed on Jul. 3, 2017 in the Korean Intellectual Property Office, the entire disclosure of which is incorporated herein by reference for all purposes.

BACKGROUND

1. Field

The following description relates to an authentication method using an infrared ray (IR) image.

2. Description of Related Art

The utilization of user authentication technology using biometrics is increasing. An infrared ray (IR) camera, which was used only for a special purpose, is now being provided in mobile devices, such as a mobile phone. Thus, iris authentication using an IR image can be utilized in various fields.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a user authentication method including obtaining first environmental information indicating an environmental condition in which an input image of a user is captured, extracting a first feature vector from the input image, selecting a second feature vector from enrolled feature vectors in an enrollment database (DB), the second feature vector including second environmental information that matches the first environmental information, and authenticating the user based on the first feature vector and the second feature vector.

The first environmental information and the second environmental information may include at least one environmental element of natural environmental information including any one or any combination of season, climate, weather, temperature, and humidity, or artificial environmental information including any one or any combination of a capturing distance between a device used to capture the input image and the user, a light direction of the input image, an illuminance, a light type, whether the input image of the user is captured indoors or outdoors, whether the user is wearing glasses, and whether the user is wearing a hat.

The selecting of the second feature vector may include selecting the second feature vector including at least one environmental element that matches the first environmental information.

The obtaining of the first environmental information may include any one or any combination of receiving the first environmental information from the user, and estimating the first environmental information.

The user authentication method may include capturing the input image using an infrared ray (IR) sensor, and receiving the input image.

The Each of the enrolled feature vectors may be labeled with corresponding environmental information.

The authenticating of the user may include calculating a similarity between the first feature vector and the second feature vector, comparing the similarity to an authentication threshold, and authenticating the user based on the comparison.

The user authentication method may include comparing the similarity to an update threshold, and enrolling the first feature vector in the enrollment DB based on the comparison to the update threshold.

The enrolling may include labeling the first feature vector with the first environmental information, in response to the similarity being greater than the update threshold, and enrolling the labeled first feature vector in the enrollment DB.

The labeling may include labeling the first feature vector with each environmental element of the first environmental information.

The input image may include any one or any combination of a face of the user and an iris of the user.

The capturing distance may be estimated based on positions of eyes of the user, or a distance between left and right eyebrows of the user in an IR input image.

The capturing distance may be estimated based on comparing a distance between eyebrows of the user in an aligned IR input image to a reference value.

In another general aspect, there is provided a user authentication method, including extracting items of biometric data from at least one input image of a user, extracting a first feature vector corresponding to each of the items of biometric data, obtaining environmental information indicating an environmental condition in which the items of biometric data are obtained, selecting, with respect to each of the items of biometric data, a second feature vector from enrolled feature vectors in an enrollment database (DB), the second feature vector including at least one environmental element that matches the environmental information, and authenticating the user based on the first feature vector and the second feature vector corresponding to each of the items of biometric data.

The items of biometric data may include any one or any combination of a face, an iris, a cornea, a fingerprint, a palm including creases, and a vein on the back of a hand of the user.

The input image of the user may include any one or any combination of an infrared ray (IR) image and a color image.

The environmental information may include at least one environmental element of natural environmental information including any one or any combination of season, climate, weather, temperature, and humidity, or artificial environmental information including any one or any combination of a capturing condition that includes a capturing distance of the input image, a light direction of the input image, an illuminance, a light type, whether the input image of the user is captured indoors or outdoors, whether the user is wearing glasses, and whether the user is wearing a hat.

The obtaining of the environmental information may include obtaining, with respect to each of the items of biometric data, the environmental information indicating the environmental condition in which the each item of biometric data is obtained.

The obtaining of the environmental information may include any one or any combination of estimating the environmental information, and receiving the environmental information.

The authenticating of the user may include calculating, with respect to each of the items of biometric data, a similarity between the first feature vector and the second feature vector, and authenticating the user based on the calculated similarity.

The authenticating of the user based on the calculated similarity may include assigning a weight to the similarity calculated with respect to each of the items of biometric data, based on the environmental information, and authenticating the user based on the weight-assigned similarity.

The authenticating of the user may include calculating a first similarity between the first feature vector and the second feature vector of a first item of biometric data from the items of biometric data, calculating a second similarity between the first feature vector and the second feature vector of a second item of biometric data from the items of biometric data, fusing the first similarity and the second similarity, and authenticating the user based on the fused similarity.

The fusing may include assigning different weights to the first similarity and the second similarity, and fusing the weight-assigned first similarity and the weight-assigned second similarity.

In another general aspect, there is provided a user authentication apparatus, including an infrared ray (IR) sensor configured to capture an input image of a user, a memory including an enrollment database (DB) in which features vectors are enrolled, and a processor configured to obtain first environmental information indicating an environmental condition in which the input image is captured, select a second feature vector including second environmental information that matches the first environmental information from the enrolled feature vectors, and authenticate the user based on a first feature vector extracted from the input image and the second feature vector.

In another general aspect, there is provided a user authentication apparatus, including a sensor configured to acquire an input image of a user, a memory including an enrollment database (DB) configured to store feature vectors enrolled with respect to each of items of biometric data, and a processor configured to extract the items of biometric data from the input image, extract a first feature vector corresponding to each of the items of biometric data, obtain environmental information indicating an environmental condition in which the items of biometric data are obtained, select, with respect to each of the items of biometric data, a second feature vector including at least one environmental element that matches the environmental information from the enrolled feature vectors, and authenticate the user based on the first feature vector and the second feature vector corresponding to each of the items of biometric data.

The memory may be configured to store a lookup table having weights for each item of biometric data corresponding to environmental information.

Other features and aspects will be apparent from the following detailed description, the drawings, and the claims.

BRIEF DESCRIPTION OF THE DRAWINGS

FIGS. 2A and 2B illustrate examples of similarity comparison results in a feature space when a capturing condition is not considered and when the capturing condition is considered, respectively.

FIG. 5 illustrates an example of a method to construct an enrollment database (DB) based on environmental information.

Figure 1:
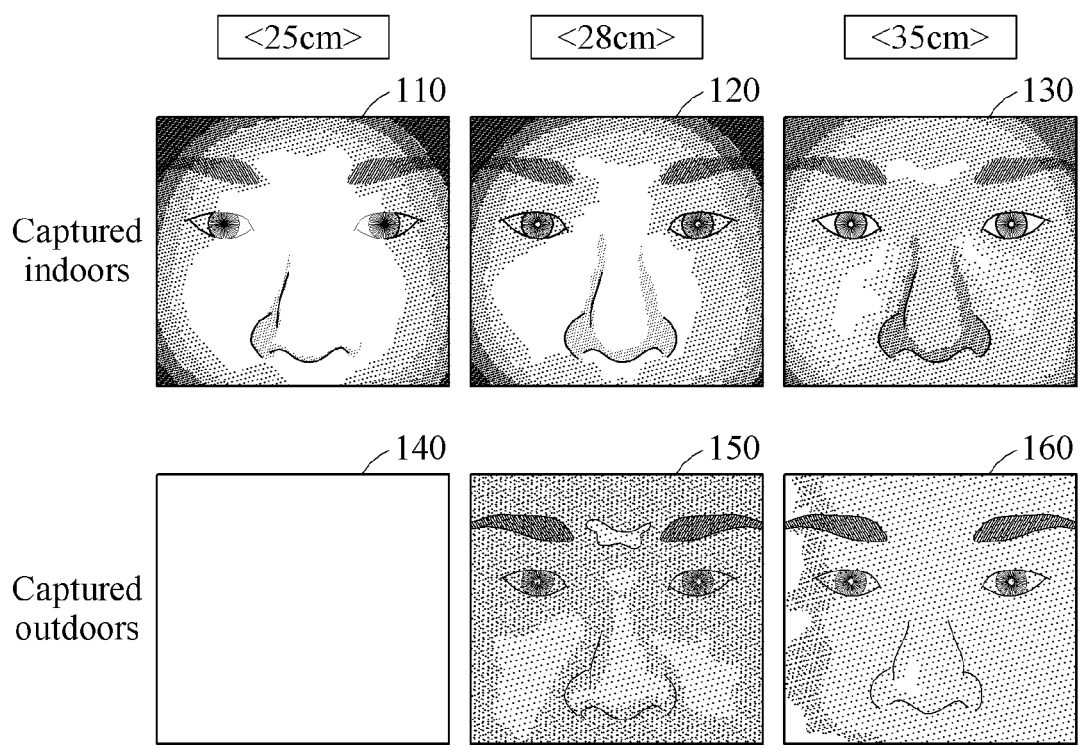
FIG. 1 illustrates examples of input images.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only and is not to be limiting of the examples. As used herein, the singular forms "a", "an", and "the" are intended to include the plural forms as well, unless the context clearly indicates otherwise.

The examples described herein may be implemented as various types of products such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a server, a personal computer (PC), a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device, portable navigation device (PND), a handheld game console, an e-book, a high definition television (HDTV), a smart appliance, a smart home appliance, an intelligent vehicle, a home appliance, a biometrics-based door lock, a security device, a financial service device, a kiosk, communication systems, image processing systems, graphics processing systems, various Internet of Things (IoT) devices that are controlled through a network, a smart vehicle, other consumer electronics/information technology (CE/IT) device, or any other device capable of wireless communication or network communication consistent with that disclosed herein. The examples may be applied to image processing for user authentication using a smart phone, a mobile device, a smart home system, an intelligent vehicle, and an automated teller machine (ATM). Further, the examples may also be applied to an intelligent vehicle system that automatically starts by authenticating a user, applied to image processing for user authentication in an intelligent vehicle, an apparatus for automatic driving, a smart home environment, a smart building environment, a smart office environment, office automation, and a smart electronic secretary system.

FIG. 1 illustrates examples of input images. Referring to FIG. 1, input images 110, 120, 130, 140, 150, and 160 that are captured using an infrared ray (IR) sensor of a mobile device in different capturing conditions are illustrated. The input images 110, 120, 130, 140, 150, and 160 correspond to normalized images.

The input images 110, 120, and 130 are images captured indoors, and the input images 140, 150, and 160 are images captured outdoors. The input images 110, 120, and 130 captured indoors are affected by IR light, when compared to the images 140, 150, and 160 captured outdoors. Further, the images 140, 150, and 160 captured outdoors are affected by natural light, when compared to the input images 110, 120, and 130 captured indoors. For example, when a face of a user 140 is captured outdoors under strong sunlight within a capturing distance of 25 centimeters (cm), the face of the user may not be captured suitably due to the excessive light.

As shown in FIG. 1, an input image captured by the IR sensor includes a face with an overly great dynamic range depending on a capturing condition although the same person is captured. Hereinafter, an input image captured by an IR sensor under IR light will be referred to as an "IR input image".

The IR input image has a tendency of wide light distribution and varying texture based on, for example, a capturing distance, whether the input image is captured indoors or outdoors, or whether the user is wearing glasses.

In view of the great dynamic range in the IR input image despite capturing the same person, an enrollment database (DB) is constructed using IR input images captured in various capturing conditions, and user authentication is performed.

Figure 2A:
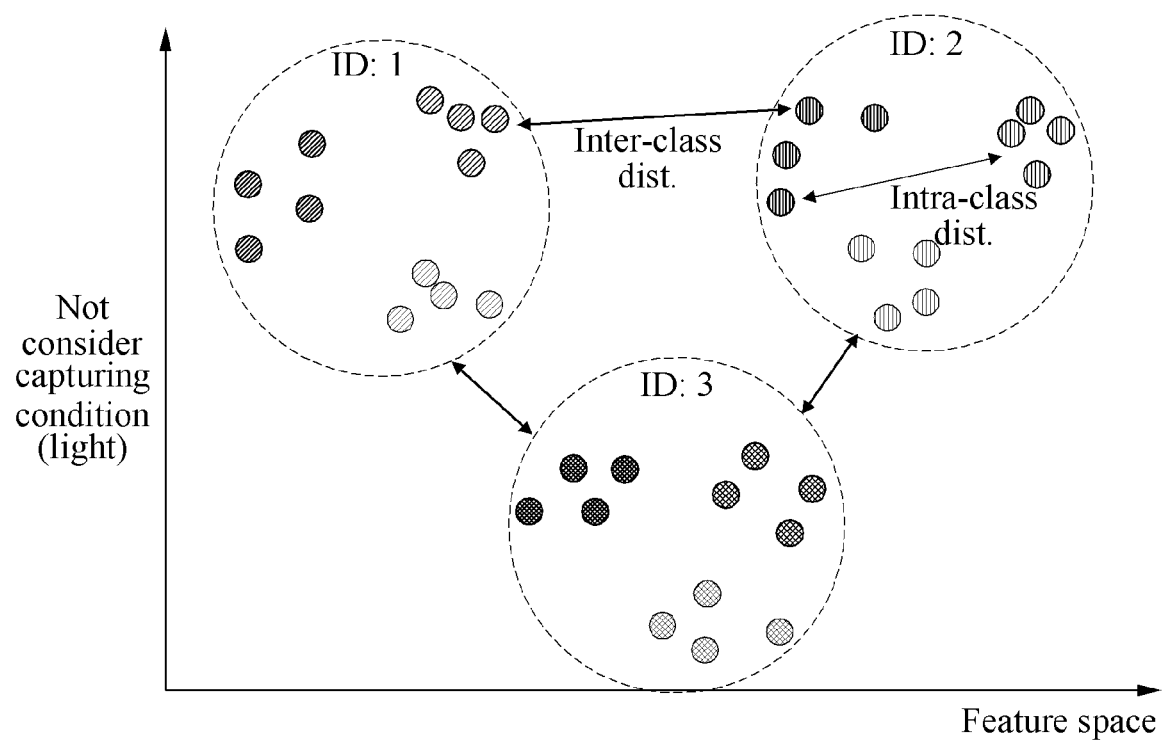

FIGS. 2A and 2B illustrate examples of similarity comparison results in a feature space when a capturing condition is not considered and when the capturing condition is considered, respectively. FIG. 2A illustrates an example of an inter-class distance and an intra-class distance in a feature space when capturing condition are not considered. FIG. 2B illustrates an example of an inter-class distance and an intra-class distance in a feature space when the capturing condition are considered.

Points in the feature spaces of FIGS. 2A and 2B represent features or feature vectors, and points included in a circle corresponding to the same identification (ID) correspond to features belonging to the same class. Points having different patterns in the same ID are features obtained in different capturing conditions. Further, a distance in the feature spaces of FIGS. 2A and 2B corresponds to a Euclidean distance or a similarity distance. A relatively short distance in a feature space indicates a relatively high similarity, and a relatively long distance in the feature space indicates a relatively low similarity. A capturing condition is, for example, a light.

When the capturing condition is not considered, as shown in FIG. 2A, a comparison between features obtained in different capturing conditions at different classes is performed. In this example, a distance between features belonging to a class of ID 1 and features belonging to a class of ID 3, i.e., an inter-class distance, is relatively short, when compared to a distance between features belonging to a class of ID 2, i.e., an intra-class distance. Features belonging to the same class should be recognized as the same user. However, when the capturing condition is not considered, as shown in FIG. 2A, a distance between features belonging to different classes is relatively short, and thus incorrect user authentication is performed.

When the capturing condition is considered, as shown in FIG. 2B, a comparison between features obtained in the same capturing condition at different classes is performed. In this example, a distance between features belonging to a class of ID 1 and features belonging to a class of ID 3, i.e., an inter-class distance, is relatively long, when compared to an intra-class distance of a class of ID 2. When the capturing condition is considered, as shown in FIG. 2B, a distance between features belonging to different classes is longer than a distance between features belonging to the same class. In this example, correct user authentication is performed.

Figure 3:
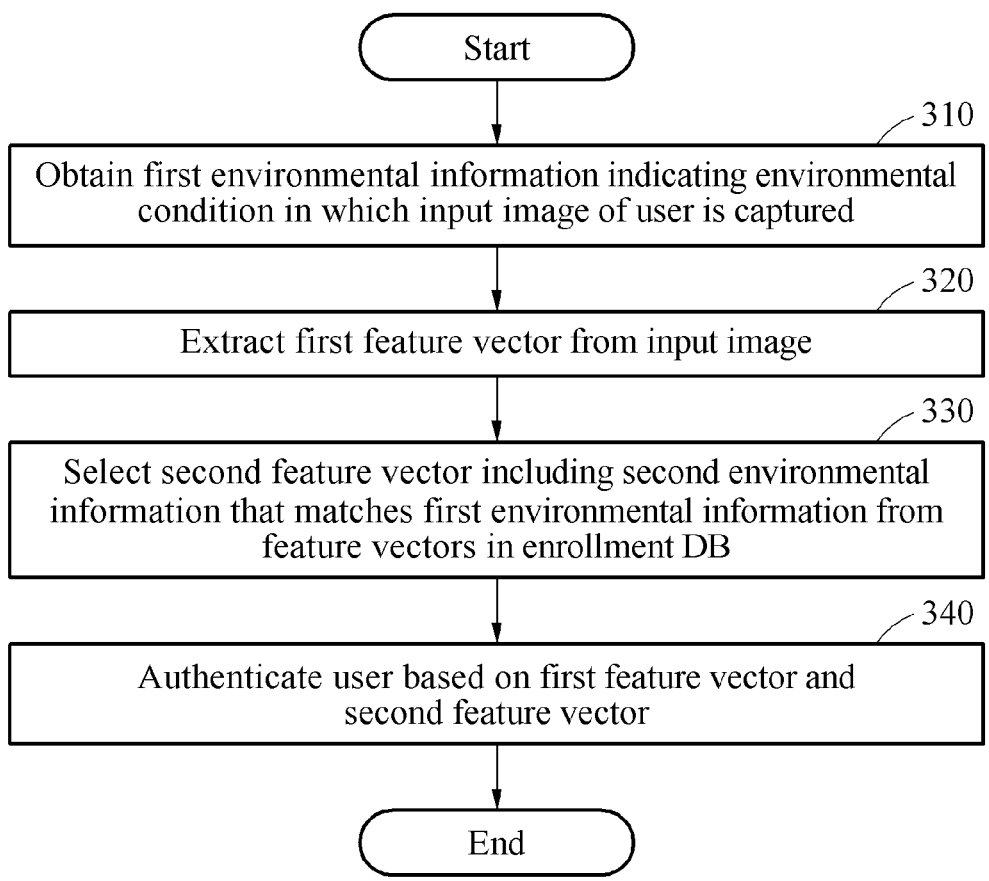
FIGS. 3 and 4 are diagrams illustrating examples of a user authentication method.

FIG. 3 is a diagram illustrating an example of a user authentication method. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2B are also applicable to FIG. 3, and are incorporated herein by reference. Thus, the above description may not be repeated here.

In an example, a user authentication apparatus, hereinafter the "authentication apparatus", to perform the user authentication method is included in various types of products such as, for example, any of the devices described above. In another example, the user authentication apparatus is configured as a separate device.

Referring to FIG. 3, in operation 310, the authentication apparatus obtains first environmental information indicating an environmental condition in which an input image of a user is captured. The input image of the user is, for example, an IR input image captured using an IR sensor after an IR light emitting diode (LED) light included in a mobile device illuminates. In an example, the input image includes any one or any combination of a face of the user and an iris of the user. The input image may be captured directly using the authentication apparatus, or may be received from an external device.

The first environmental information is information indicating an environmental condition in which the input image of the is captured. In an example, the input image is an IR image and includes, for example, at least one environmental element of natural environmental information such as season, climate, weather or humidity, and artificial environmental information including any one or any combination of a capturing condition that includes a capturing distance between a device used to capture the input image and the user, a light direction of the input image, an illuminance, a light type, whether the input image is captured indoors or outdoors, whether the user is wearing glasses, and whether the user is wearing a hat. Other environmental information such as, for example, time of day, may be used without departing from the spirit and scope of the illustrative examples described. In an example, the device used to capture the input image is the authentication apparatus such as a mobile device, or an IR camera.

In an example, the authentication apparatus receives the first environmental information directly from the user. In an example, when capturing the input image, the authentication apparatus provides an audio guide for capturing, such as, for example, "move back 20 cm from the capturing device", "take photo indoors", or "take off sunglasses or a hat". The authentication apparatus sets environmental information included in the audio guide as the first environmental information of the input image.

In an example, the authentication apparatus estimates the first environmental information from the input image. For example, the capturing distance is estimated based on positions of eyes of the user, or a distance between left and right eyebrows of the user in the IR input image. The authentication apparatus aligns the IR input image, and estimates the capturing distance by comparing the distance between the eyebrows in the aligned IR input image to a reference value. The authentication apparatus estimates the light direction of the IR input image, the illuminance, or the light type, for example, using various learning algorithms. In addition, the authentication apparatus estimates whether a light is an indoor light or an outdoor light, for example, sunlight, using an auto exposure algorithm.

In operation 320, the authentication apparatus extracts a first feature vector from the input image. The first feature vector may be construed as a feature vector indicating a feature extracted from the input image for recognition of a face, an iris, or a fingerprint. The authentication apparatus extracts the first feature vector from the input image using various schemes, for example, local binary patterns (LBP), Gabor, and deep learning.

In operation 330, the authentication apparatus selects a second feature vector including second environmental information that matches the first environmental information from enrolled feature vectors in an enrollment DB. In an example, the enrolled feature vectors each are labeled with corresponding environmental information. For example, when the input image is captured indoors at a capturing distance of 25 cm, a corresponding enrolled feature vector is tagged with indoor, capturing distance 25 cm, or labeled with the same content. In an example, the enrollment DB is also referred to as an "enrollment template". The authentication apparatus selects a second feature vector including at least one environmental element that matches the first environmental information from the enrolled feature vectors.

In operation 340, the authentication apparatus authenticates the user based on the first feature vector and the second feature vector. The authentication apparatus calculates a similarity between the first feature vector and the second feature vector, and compares the calculated similarity to a authentication threshold. The authentication apparatus authenticates the user based on a result of the comparison. For example, when the similarity is greater than the authentication threshold, the authentication apparatus authenticates the user.

Figure 4:
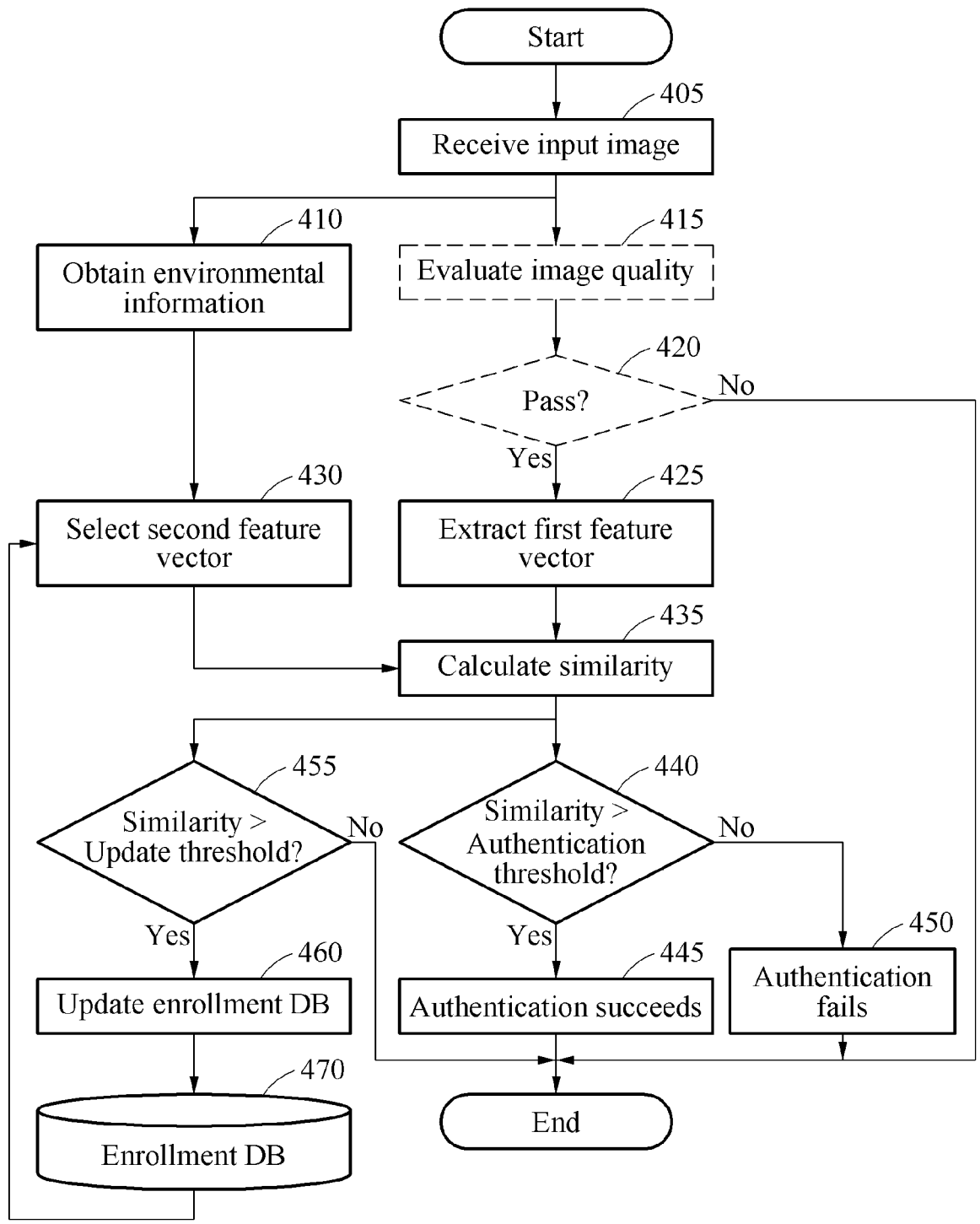

FIG. 4 is a diagram illustrating an example of a user authentication method. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

User authentication using an input image is performed by constructing an enrollment DB through initial enrollment of an input image of a user. The initial enrollment is performed by capturing the input image of the user at a location, for example, indoors, within a distance from a device. In this example, a feature vector or a feature code generated through a process of extracting a feature from the input image is initially enrolled in the enrollment DB or an enrollment set. When initial enrollment of the input image is completed, the authentication apparatus performs user authentication through a process of FIG. 4.

Referring to FIG. 4, in operation 405, the authentication apparatus receives an input image. In operation 410, the authentication apparatus obtains environmental information from the input image. In this example, the obtained environmental information is first environmental information, and is used to select a second feature vector in an enrollment DB 470, in operation 430. The input image is an IR input image.

In operation 415, the authentication apparatus evaluates an image quality of the input image. In operation 420, the authentication apparatus determines whether the image quality satisfies a condition (pass or fail). When the image quality does not satisfy the condition (if fail), the authentication apparatus terminates the operation. In FIG. 4, operations 415 and 420 indicated with broken lines are selectively performed according to an embodiment.

When the image quality satisfies the condition (if pass), the authentication apparatus extracts a first feature vector from the input image, in operation 425. The authentication apparatus labels the first feature vector with the environmental information, i.e., the first environmental information, obtained in operation 410.

In operation 435, the authentication apparatus calculates a similarity between the first feature vector and the second feature vector selected in the enrollment DB 470. In an example, the second feature vector is an enrolled feature vector including second environmental information that matches the first environmental information obtained in operation 410, among enrolled feature vectors in the enrollment DB 470. The authentication apparatus verifies whether an enrolled feature vector is the enrolled feature vector, i.e., the second feature vector, corresponding to the second environmental information that matches the first environmental information by comparing the first environmental information that the first feature vector is labeled with to environmental information that is the corresponding enrolled feature vector is labeled with.

In operation 435, the similarity is calculated in a form of, for example, a normalized cross correlation (NCC) between feature vectors, or a matching score.

In an example, a user authentication rate is improves and a user misrecognition rate is minimized by selectively comparing an enrolled feature vector corresponding to an image captured in an environment that is the same as or similar to an environmental condition in which the input image, for example, the IR input image, is captured. Rather than comparing all of the enrolled feature vectors in the enrollment DB 470 to the first feature vector. In this example, by selecting the enrolled feature vector corresponding to an image captured in the environment that is the same as or similar to the environmental condition in which the input image is captured, an authentication threshold for user authentication is relatively greater, when compared to a case of not considering an environmental condition. In an example, a false acceptance rate (FAR) is reduced by setting the authentication threshold that determines whether authentication succeeds to be relatively great, when compared to the case of not considering the environmental condition.

In operation 440, the authentication apparatus determines whether the similarity is greater than an authentication threshold. When it is determined that the similarity is greater than the authentication threshold, in operation 445, the authentication apparatus determines authentication to succeed. When it is determined that the similarity is less than or equal to the authentication threshold, in operation 450, the authentication apparatus determines authentication to fail.

In operation 455, the authentication apparatus determines whether the similarity is greater than an update threshold. When it is determined that that the similarity is less than or equal to the update threshold, the authentication apparatus terminates the operation. When it is determined that that the similarity is greater than the update threshold, in operation 460, the authentication apparatus updates the enrollment DB 470 using the first feature vector. In an example, the update threshold is greater than the authentication threshold.

In operation 460, the authentication apparatus labels the first feature vector with each environmental element of the first environmental information, and updates the enrollment DB 470 using the labeled first feature vector.

FIG. 5 illustrates an example of a method to construct an enrollment DB based on environmental information.

An authentication apparatus captures an IR input image while maintaining a capturing distance, such as, for example, about 25 cm to 40 cm, between a device and a user. The authentication apparatus illuminates an IR LED while the user faces forward, and captures the IR input image using an IR sensor. As shown in FIG. 1, the form of the IR input image may radically change depending on the capturing distance between the device and the user, although the same person is captured. Further, the form of the IR input image may exhibit a great dynamic range when the image is captured outdoor, which is greatly affected by light, dissimilar to indoor capturing. Whether the user is wearing glasses or whether the user is wearing a hat also has effects similar to those of a case in which the distance or light changes.

The authentication apparatus labels the first feature vector extracted from the input image with environmental information indicating an environmental condition in which the IR input image is captured. For example, the environmental condition includes whether the user is wearing glasses, the capturing distance, and whether the input image is captured indoors or outdoors. In this example, the first feature vector is mapped in a three-dimensional (3D) feature space, as shown in a circle 510 of FIG. 5. Feature vectors already included in the 3D feature space are feature vectors enrolled in an enrollment DB, and have labels corresponding to the above three environmental conditions, i.e., whether the user is wearing glasses, the capturing distance, and whether the input image is captured indoors or outdoors.

The enrollment DB is constructed by adding a feature vector to be enrolled additionally, for example, the first feature vector, such that the feature vectors may be evenly distributed in the 3D feature space. Whether to add the corresponding feature vector, for example, the first feature vector, is determined based on matching scores with the already enrolled feature vectors, for example, second feature vectors.

The authentication apparatus constructs the enrollment DB such that a distance between the already enrolled feature vectors and the feature vector to be enrolled additionally, for example, the first feature vector, is maximized in the 3D feature space. In this example, the feature vector to be enrolled additionally needs to satisfy an environmental condition within a matching score sought by the already enrolled feature vectors.

In an example, in consideration of the multi-dimensional features of the input image, an enrolled feature vector having a label corresponding to each piece of environmental information indicating an environmental condition in which the corresponding image is captured is stored in the enrollment DB. In this example, the label corresponding to each piece of the environmental information includes contents 530 of FIG. 5.

In an example, the authentication apparatus constructs a field related to each label corresponding to each piece of the environmental information, and stores enrolled feature vectors including the label corresponding to the field.

In an example, not only the degree of similarity score of the authentication object, for example, a face of the user, is simply distributed in the feature space but also the degree of similarity in terms of various environmental conditions is also diversely distributed. Thus, the matching performance may improve and a false acceptance rate (FAR) with respect to another person may also be reduced.

Figure 6:
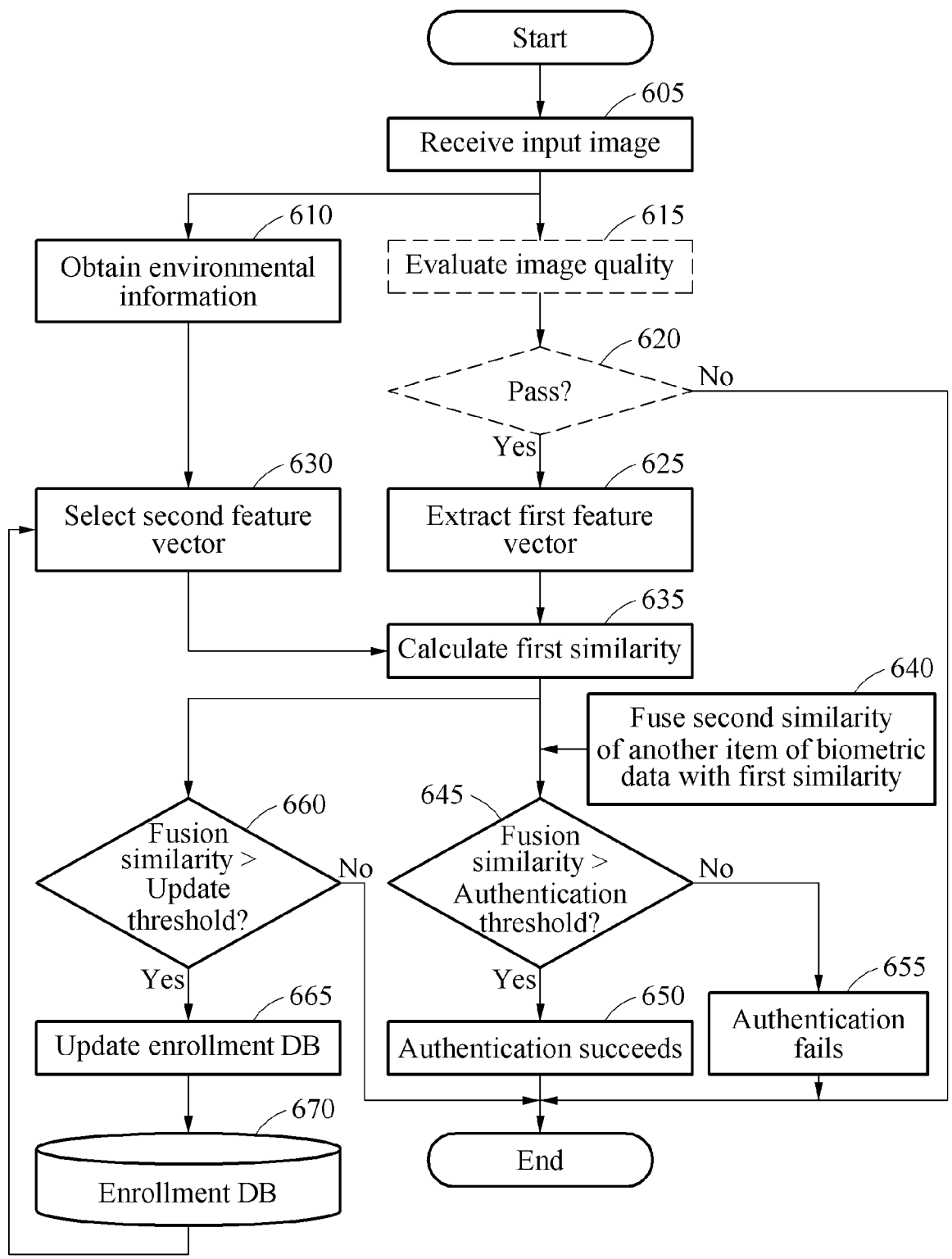
FIGS. 6 and 7 are diagrams illustrating examples of a user authentication method.

FIG. 6 is a diagram illustrating an example of a user authentication method. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, an authentication apparatus performs authentication and enrollment DB update using a new fusion similarity obtained by fusing similarities with respect to various authentication objects, such as a face, a fingerprint, and an iris. Operations 605 through 635 of FIG. 6 are the similar to operations 405 through 435 of FIG. 4, and thus duplicated description will be omitted here for conciseness.

In response to calculation of a similarity, for example, a first similarity, between a first feature vector extracted in operation 625 and a second feature vector selected in an enrollment DB 670, the authentication apparatus fuses the first similarity with a second similarity of another item of biometric data, in operation 640. For example, the first similarity is related to a face of a user, and the second similarity is related to a fingerprint of the user or an iris of the user. There may be provided a single second similarity or a plurality of second similarities.

In operation 640, the authentication apparatus calculates a fusion similarity based on the first similarity with respect to the face of the user and the second similarity with respect to the iris of the user. The authentication apparatus calculates the fusion similarity by assigning different weights to the first similarity and the second similarity. In this example, the different weights are determined based on, for example, environmental conditions in which the authentication objects are acquired, respectively.

In operation 645, the authentication apparatus determines whether the fusion similarity is greater than a authentication threshold. When it is determined that the fusion similarity is greater than the authentication threshold, in operation 650, the authentication apparatus determines that authentication succeeds. When it is determined that the fusion similarity is less than or equal to the authentication threshold, in operation 655, the authentication apparatus determines that authentication fails.

In operation 660, the authentication apparatus determines whether the fusion similarity is greater than an update threshold. When it is determined that the fusion similarity is less than or equal to the update threshold, the authentication apparatus terminates the operation. When it is determined that the fusion similarity is greater than the update threshold, in operation 665, the authentication apparatus updates the enrollment DB 670 using the first feature vector and the fusion similarity. In this example, the update threshold is greater than the authentication threshold.

In operation 665, the authentication apparatus labels the first feature vector with each environmental element of the first environmental information, and updates the enrollment DB 670 using the labeled first feature vector and the fusion similarity.

Figure 7:
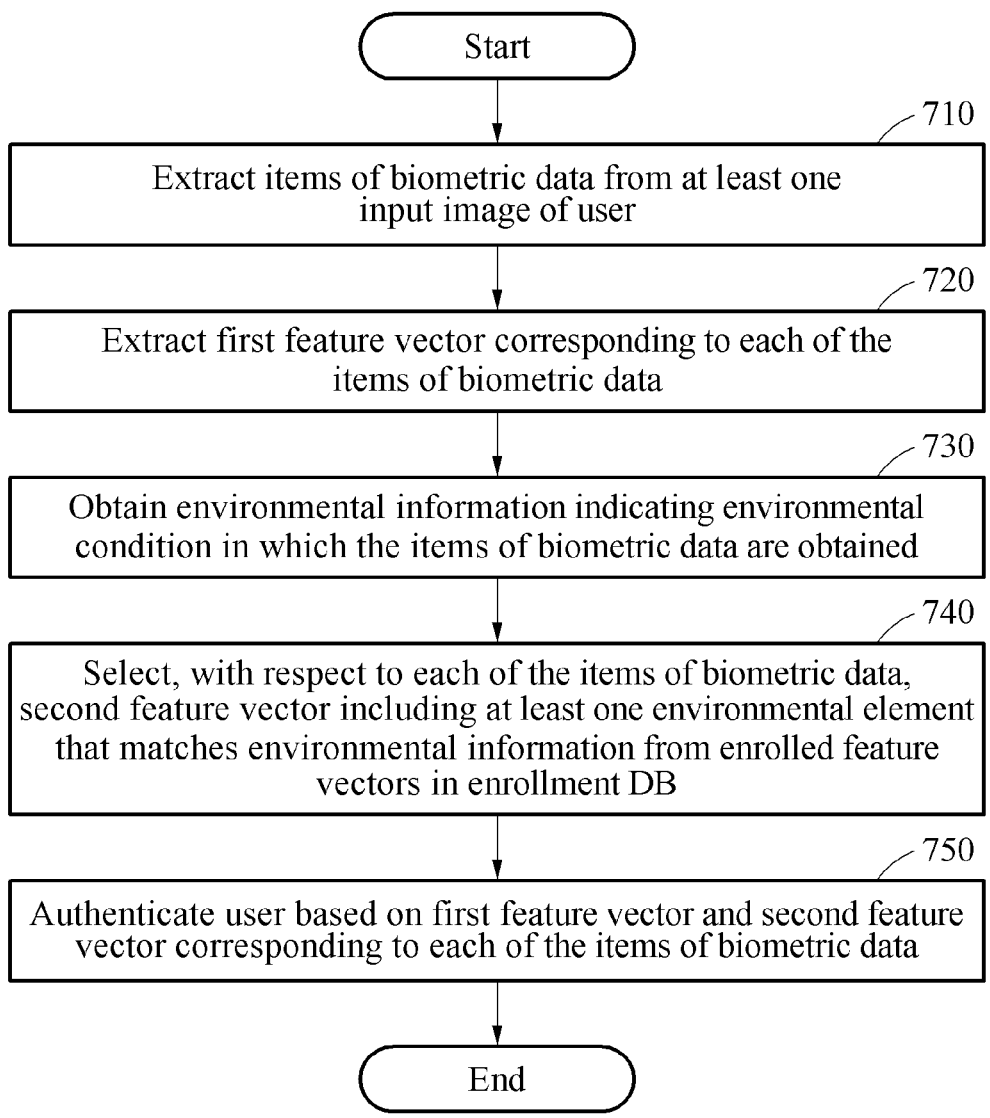

FIG. 7 is a diagram illustrating an example of a user authentication method. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

The authentication method may be applied to sole authentication using an IR image, and also to complex authentication in which biometric data such as a color image, a fingerprint, and an iris are combined with an IR image.

Referring to FIG. 7, in operation 710, an authentication apparatus extracts a items of biometric data from at least one input image of a user. A single input image of the user or a plurality of input images of the user may be provided. The input image of the user includes any one or any combination of an IR image and a color image. The plurality of items of biometric data include, for example, a face, an iris, a cornea, a fingerprint, a palm including creases, and a vein on the back of a hand of the user. In this example, the iris includes, for example, a shape of the iris, a color of the iris, and morphemes of retinal capillaries.

In an example, the authentication apparatus extracts the face and the iris of the user from the IR image, or extracts the iris from the IR image and the face or the fingerprint from the color image.

In operation 720, the authentication apparatus extracts a first feature vector corresponding to each of the items of biometric data.

In operation 730, the authentication apparatus obtains environmental information indicating an environmental condition in which each of the items of biometric data are obtained. The environmental information includes at least one environmental element of natural environmental information including any one or any combination of season, climate, weather, temperature, and humidity, and artificial environmental information including any one or any combination of a capturing condition that includes a capturing distance between a device used to capture the input image and the user, a light direction of the input image, an illuminance, a light type, whether the input image is captured indoors or outdoors, whether the user is wearing glasses, and whether the user is wearing a hat. Other environmental information such as, for example, time of day, may be used without departing from the spirit and scope of the illustrative examples described.

The authentication apparatus obtains, with respect to each of the items of biometric data, the environmental information indicating the environmental condition in which the items of biometric data are obtained. The authentication apparatus estimates the environmental information, or receives the environmental information from the user.

In operation 740, the authentication apparatus selects, with respect to each of the items of biometric data, a second feature vector including at least one environmental element that matches the environmental information from enrolled feature vectors in an enrollment DB. In this example, an enrollment DB corresponding to each of the items of biometric data is provided, or a single integrated enrollment DB including all of the items of biometric data is provided.

In operation 750, the authentication apparatus authenticates the user based on the first feature vector and the second feature vector corresponding to each of the items of biometric data. The authentication apparatus calculates, with respect to each of the items of biometric data, a similarity between the first feature vector and the second feature vector. The authentication apparatus authenticates the user based on the similarity calculated with respect to each of the items of biometric data. In an example, the authentication apparatus assigns a different weight to the similarity calculated with respect to each of the items of biometric data, based on the environmental information, and authenticates the user based on the weight-assigned similarity.

Hereinafter, an example of a method to perform complex authentication using a items of biometric data, for example, a face and an iris of a user, extracted from a single image using an authentication apparatus will be described in detail.

The authentication apparatus extracts a items of biometric data, for example, a face and an iris of a user, from a single IR input image, and extracts a first feature vector corresponding to the face of the user and a first feature vector corresponding to the iris of the user, respectively. In this example, the authentication apparatus obtains environmental information indicating an environmental condition in which the face and the iris of the user are acquired, i.e., the environmental condition in which the input image is captured.

When the input image is captured outdoors on a sunny day at a capturing distance of 28 cm while the user is wearing a hat, the authentication apparatus obtains environmental information corresponding to "weather: sunny", "indoors/outdoors: outdoors", "capturing distance: 28 cm", and "hat: wearing hat". In this example, the authentication apparatus also obtains, as the environmental information, an incidence direction of sunlight corresponding to a direction of outdoor light, an illuminance, and a shade on the face of the user made by the hat.

The authentication apparatus labels each of the first feature vector corresponding to the face of the user and the first feature vector corresponding to the iris of the user with the obtained environmental information.

The authentication apparatus selects, from enrolled feature vectors in an enrollment DB corresponding to the face of the user, a second feature vector with respect to the face of the user, the second feature vector including an environmental element that matches the environmental information of the input image, for example, "weather: sunny", "indoors/outdoors: outdoors", "capturing distance: 28 cm", and "hat: wearing hat". Further, the authentication apparatus selects, from enrolled feature vectors in an enrollment DB corresponding to the iris of the user, a second feature vector with respect to the iris of the user, the second feature vector including an environmental element that matches the environmental information of the input image, for example, "weather: sunny", "indoors/outdoors: outdoors", "capturing distance: 28 cm", and "hat: wearing hat".

In an example, the authentication apparatus calculates a similarity between the first feature vector corresponding to the face of the user and the second feature vector corresponding to the face of the user, and calculates a similarity between the first feature vector corresponding to the iris of the user and the second feature vector corresponding to the iris of the user.

In an example, the authentication apparatus assigns different weights to the similarity with respect to the face of the user and the similarity with respect to the iris of the user based on the environmental information of the input image.

For example, when the iris of the user is captured using an IR sensor outdoors on a sunny day, morphemes of retinal capillaries of the iris may not be verified accurately due to the sunlight. When the face of the user is captured outdoors under strong sunlight within a capturing distance of 25 cm, the face of the user may not be captured suitably due to the excessive light.

In an example, the authentication apparatus sets and assigns different weights to respective similarities with respect to biometric data, by considering in advance a weakness or defect that may occur in the biometric data extracted with respect to each environmental element included in the environmental information. The weights for the similarities with respect to the biometric data are provided in advance in the form of a lookup table based on the environmental information. For example, in a case in which the environmental information corresponds to a sunny day, outdoors, and a capturing distance of 28 cm, the authentication apparatus assigns a weight of 0.9 to the similarity with respect to the face of the user, and assigns a weight of 0.1 to the similarity with respect to iris of the user. The authentication apparatus authenticates the user by comparing a sum of the weight-assigned to similarities to an authentication threshold.

Figure 8:
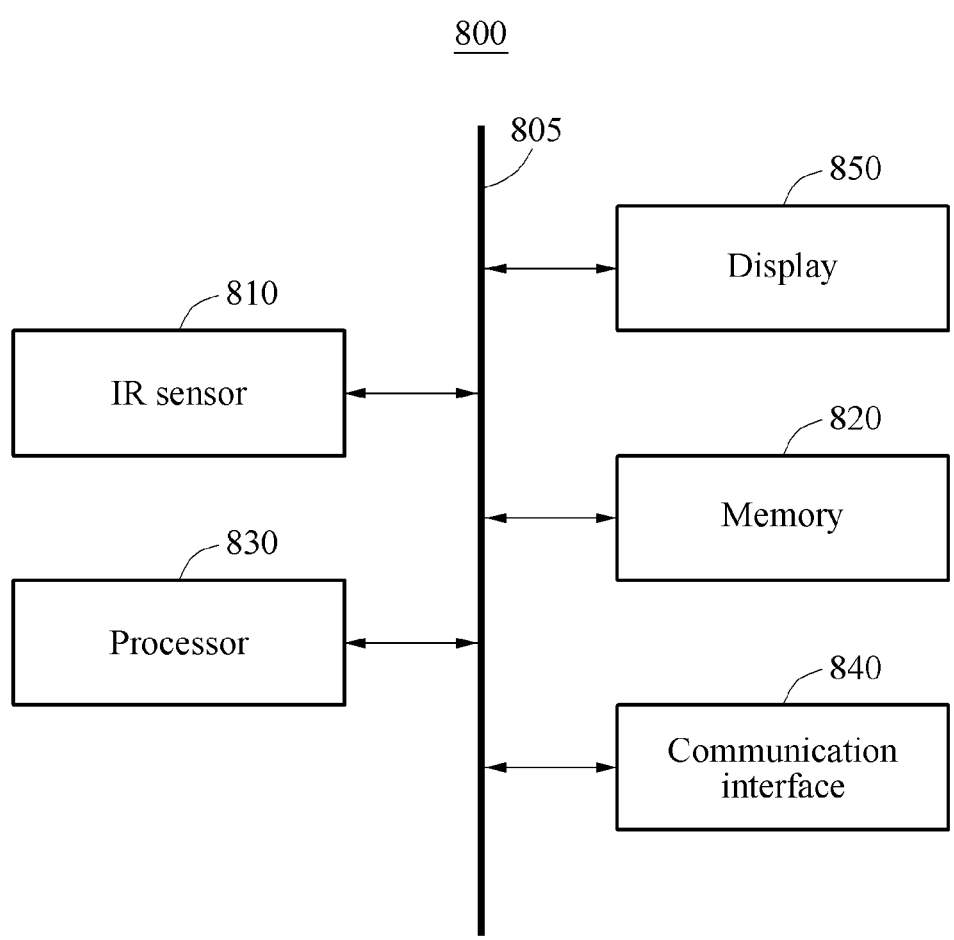
FIGS. 8 and 9 are diagrams illustrating examples of a user authentication apparatus.

FIG. 8 is a diagram illustrating an example of a user authentication apparatus. Referring to FIG. 8, an authentication apparatus 800 includes an IR sensor 810, a memory 820, a processor 830, a communication interface 840, and a display 850. The IR sensor 810, the memory 820, the processor 830, the communication interface 840 communicate with each other through a communication bus 805.

The IR sensor 810 captures an input image of a user.

The memory 820 includes an enrollment DB in which feature vectors are enrolled. The memory 820 is a volatile memory or a non-volatile memory, and further details of the memory are provided below.

The processor 830 obtains first environmental information indicating an environmental condition in which the input image is captured. The processor 830 selects a second feature vector including second environmental information that matches the first environmental information from the enrolled feature vectors. The processor 830 authenticates the user based on a first feature vector extracted from the input image and the second feature vector. The processor 830 displays a result of the authentication on the display 850.

In an example, the authentication apparatus 800 provides the result of the authentication to a display 850. In an example, the display 850 is a physical structure that includes one or more hardware components that provide the ability to render a user interface and/or receive user input. The display 850 can encompass any combination of display region, gesture capture region, a touch sensitive display, and/or a configurable area. In an example, the display 850 is an external peripheral device that may be attached to and detached from the virtual lane generating device. The display 850 may be a single-screen or a multi-screen display. A single physical screen can include multiple displays that are managed as separate logical displays permitting different content to be displayed on separate displays although part of the same physical screen. The display 850 may also be the display of a smart phone or an eye glass display (EGD), which includes one-eyed glass or two-eyed glasses. In another example, the authentication apparatus 800 outputs the result of the authentication determination using an audio signal through a speaker. In another example, the authentication apparatus 800 outputs the result of the authentication determination using a vibration generator, or other devices configured to provide the output to the user.

The processor 830 performs at least one method described with reference to FIGS. 1 through 7 or an algorithm corresponding to the method. The processor 830 executes a program, and controls the authentication apparatus 800. A program code to be executed by the processor 830 is stored in the memory 820.

The communication interface 840 receives, from the user, the environmental condition in which the input image is captured. In an example, the display 850 is external to the communication interface. In another example, the display 850 is incorporated in the communication interface.

Figure 9:
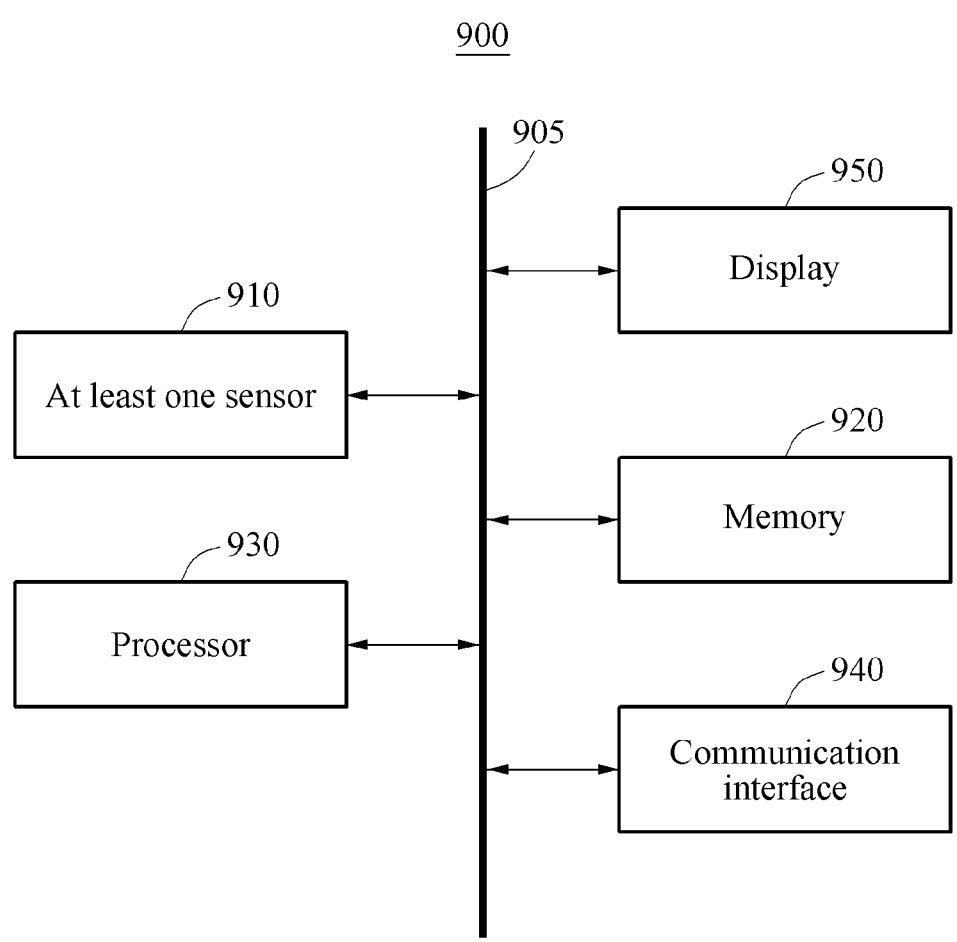

FIG. 9 is a diagram illustrating an example of a user authentication apparatus. Referring to FIG. 9, an authentication apparatus 900 includes a sensor 910, a memory 920, a processor 930, a communication interface 940, and a display 950. The sensor 910, the memory 920, the processor 930, the communication interface 940, and the display 950 communicate with each other through a communication bus 905.

The sensor 910 obtains at least one input image of a user.

The memory 920 includes an enrollment DB configured to store enrolled feature vectors corresponding to each of a plurality of items of biometric data. The memory 920 is a volatile memory or a non-volatile memory. The memory 920 stores a lookup table in which weights (with respect to similarities) for respective items of biometric data corresponding to environmental information are stored. Further details of the memory are provided below.

The processor 930 extracts the plurality of items of biometric data from the input image, and extracts a first feature vector corresponding to each of the plurality of items of biometric data. The processor 930 obtains environmental information indicating an environmental condition in which the plurality of biometric data are obtained. The processor 930 selects, with respect to each of the plurality of items of biometric data, a second feature vector including at least one environmental element that matches the environmental information from the enrolled feature vectors. The processor 930 authenticates the user based on the first feature vector and the second feature vector corresponding to each of the plurality of items of biometric data.

The display 950 is similar to the display 850, and the description of display 850 is also applicable to display 950, and is incorporated herein by reference. Thus, the above description may not be repeated here for brevity.

The communication interface 940 receives the at least one input image, or receives the environmental condition in which the input image is captured from the user.

Further, the processor 930 performs at least one method described with reference to FIGS. 1 through 7 or an algorithm corresponding to the at least one method. The processor 930 executes a program, and controls the authentication apparatus 900. A program code to be executed by the processor 930 is stored in the memory 920. In an example, the authentication apparatus 900 is connected to an external device, for example, a personal computer or a network through an input/output device (not shown), and exchanges data with the external device.

The user authentication apparatuses 800 and 900, and other apparatuses, units, modules, devices, and other components described herein with respect to FIGS. 8 and 9 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The user authentication methods illustrated in FIGS. 3, 4, 6 and 7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after gaining a thorough understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A user authentication method, comprising:
    obtaining first environmental information indicating an environmental condition in which an input image of a user is captured;
    extracting a first feature vector from the input image;
    selecting a second feature vector from enrolled feature vectors in an enrollment database (DB), the second feature vector comprising second environmental information that matches the first environmental information;
    calculating a similarity between the first feature vector and the second feature vector;
    authenticating the user based on the similarity; and
    enrolling the first feature vector in the enrollment DB based on a comparison of the similarity to an update threshold.

2. The user authentication method of claim 1, wherein the first environmental information and the second environmental information comprise at least one environmental element of:
    natural environmental information comprising any one or any combination of season, climate, weather, temperature, and humidity; or
    artificial environmental information comprising any one or any combination of a capturing distance between a device used to capture the input image and the user, a light direction of the input image, an illuminance, a light type, whether the input image of the user is captured indoors or outdoors, whether the user is wearing glasses, and whether the user is wearing a hat.

3. The user authentication method of claim 2, wherein the selecting of the second feature vector comprises selecting the second feature vector comprising at least one environmental element that matches the first environmental information.

4. The user authentication method of claim 2, wherein the capturing distance is estimated based on positions of eyes of the user, or a distance between left and right eyebrows of the user in an IR input image.

5. The user authentication method of claim 2, wherein the capturing distance is estimated based on comparing a distance between eyebrows of the user in an aligned IR input image to a reference value.

6. The user authentication method of claim 1, wherein the obtaining of the first environmental information comprises any one or any combination of:
    receiving the first environmental information from the user; and
    estimating the first environmental information.

7. The user authentication method of claim 1, further comprising:
    capturing the input image using an infrared ray (IR) sensor; and
    receiving the input image.

8. The user authentication method of claim 1, wherein each of the enrolled feature vectors are labeled with corresponding environmental information.

9. The user authentication method of claim 1, wherein the authenticating of the user comprises:
    comparing the similarity to an authentication threshold; and
    authenticating the user based on the comparison.

10. The user authentication method of claim 1, wherein the enrolling comprises:
    labeling the first feature vector with the first environmental information, in response to the similarity being greater than the update threshold; and
    enrolling the labeled first feature vector in the enrollment DB.

11. The user authentication method of claim 10, wherein the labeling comprises labeling the first feature vector with each environmental element of the first environmental information.

12. The user authentication method of claim 1, wherein the input image comprises any one or any combination of a face of the user and an iris of the user.

13. A non-transitory computer-readable storage medium storing instructions that, when executed by a processor, cause the processor to perform the user authentication method of claim 1.

14. A user authentication method, comprising:
extracting items of biometric data from at least one input image of a user;
extracting a first feature vector corresponding to each of the items of biometric data;
obtaining environmental information indicating an environmental condition in which the items of biometric data are obtained;
selecting, with respect to each of the items of biometric data, a second feature vector from enrolled feature vectors in an enrollment database (DB), the second feature vector comprising at least one environmental element that matches the environmental information;
calculating a first similarity between the first feature vector and the second feature vector of a first item of biometric data from the items of biometric data;
calculating a second similarity between the first feature vector and the second feature vector of a second item of biometric data from the items of biometric data;
fusing the first similarity and the second similarity; and
authenticating the user based on the fused similarity.

15. The user authentication method of claim 14, wherein the items of biometric data comprise any one or any combination of a face, an iris, a cornea, a fingerprint, a palm including creases, and a vein on the back of a hand of the user.

16. The user authentication method of claim 14, wherein the input image of the user comprises any one or any combination of an infrared ray (IR) image and a color image.

17. The user authentication method of claim 14, wherein the environmental information comprises at least one environmental element of:
natural environmental information comprising any one or any combination of season, climate, weather, temperature, and humidity; or
artificial environmental information comprising any one or any combination of a capturing condition that includes a capturing distance of the input image, a light direction of the input image, an illuminance, a light type, whether the input image of the user is captured indoors or outdoors, whether the user is wearing glasses, and whether the user is wearing a hat.

18. The user authentication method of claim 14, wherein the obtaining of the environmental information comprises obtaining, with respect to each of the items of biometric data, the environmental information indicating the environmental condition in which the each item of biometric data is obtained.

19. The user authentication method of claim 14, wherein the obtaining of the environmental information comprises any one or any combination of:
estimating the environmental information; and
receiving the environmental information.

20. The user authentication method of claim 14, wherein the authenticating of the user comprises:
calculating, with respect to each of the items of biometric data, a similarity between the first feature vector and the second feature vector; and
authenticating the user based on the calculated similarity.

21. The user authentication method of claim 20, wherein the authenticating of the user based on the calculated similarity comprises:
assigning a weight to the similarity calculated with respect to each of the items of biometric data, based on the environmental information; and
authenticating the user based on the weight-assigned similarity.

22. The user authentication method of claim 14, wherein the fusing comprises:
assigning different weights to the first similarity and the second similarity; and
fusing the weight-assigned first similarity and the weight-assigned second similarity.

23. A user authentication apparatus, comprising:
an infrared ray (IR) sensor configured to capture an input image of a user;
a memory comprising an enrollment database (DB) in which features vectors are enrolled; and
a processor configured to
obtain first environmental information indicating an environmental condition in which the input image is captured,
select a second feature vector including second environmental information that matches the first environmental information from the enrolled feature vectors,
calculate a similarity between a first feature vector extracted from the input image and the second feature vector,
authenticate the user based on the similarity; and
enroll the first feature vector in the enrollment DB based on a comparison of the similarity to an update threshold.

24. A user authentication apparatus, comprising:
a sensor configured to acquire an input image of a user;
a memory comprising an enrollment database (DB) configured to store feature vectors enrolled with respect to each of items of biometric data; and
a processor configured to
extract the items of biometric data from the input image,
extract a first feature vector corresponding to each of the items of biometric data,
obtain environmental information indicating an environmental condition in which the items of biometric data are obtained,
select, with respect to each of the items of biometric data, a second feature vector including at least one environmental element that matches the environmental information from the enrolled feature vectors,
calculate a first similarity between the first feature vector and the second feature vector of a first item of biometric data from the items of biometric data,
calculate a second similarity between the first feature vector and the second feature vector of a second item of biometric data from the items of biometric data,
fuse the first similarity and the second similarity, and
authenticate the user based on the fused similarity.

25. The user authentication apparatus of claim 24, wherein the memory is configured to store a lookup table having weights for each item of biometric data corresponding to environmental information.

* * * * *